Nov. 17, 1964     W. R. ZOJAC     3,156,970
TORQUE CONVERTER ELEMENTS AND METHODS OF MAKING THE SAME
Filed July 14, 1961

INVENTOR.
Walter R. Zojac
BY W.C. Middleton
ATTORNEY

United States Patent Office 3,156,970
Patented Nov. 17, 1964

3,156,970
TORQUE CONVERTER ELEMENTS AND METHODS OF MAKING THE SAME
Walter R. Zojac, Detroit, Mich., assignor to General Motors Corporation, Detroit, Mich., a corporation of Delaware
Filed July 14, 1961, Ser. No. 124,108
3 Claims. (Cl. 29—156.8)

This invention relates to torque converter elements and methods of making the same.

Hydrodynamic torque converters utilized for transmitting and multiplying torque employ converter elements such as pumps or impellers, turbines or runners, and stators or reaction elements. Each element comprises an outer shroud and an inner shroud spaced apart and joined by a plurality of blades or vanes. Such elements can be constructed in various fashions such as by having the component parts thereof stamped from sheet metal and welded or brazed together or by having the same cast with the employment of cores for the shaping of the particular blades.

It is desirable that these elements be made by diecasting, but certain problems have proved that such a method of making an element is not feasible in instances of elements embodying blades which have differing configuration as between the nose portion and the tail portion. If the blade is of airfoil section and is curved as is common practice, such an element cannot be diecast with the shrouds in ring form due to the fact that dies must have an axial draw which is not possible due to the angularity of the blades and the varying shapes of the blades.

Accordingly, it is an object of the present invention to make possible the production of a torque converter element by diecasting the same thereof in lineal strip form which obviates the disadvantages of axial draw.

Another object of the invention is provided a method of forming a torque converter element which comprises diecasting a shroud member in lineal strip form with a plurality of blades extending therefrom; rolling a selected length of the strip so formed into ring shape with the blades extending radially and having exposed ends, and finally securing another ring-like shroud to the exposed ends of the blades.

The advantages inherent in the proposed method of making a torque converter element will be apparent from the following description thereof as related to the accompanying drawing wherein.

Figure 2:
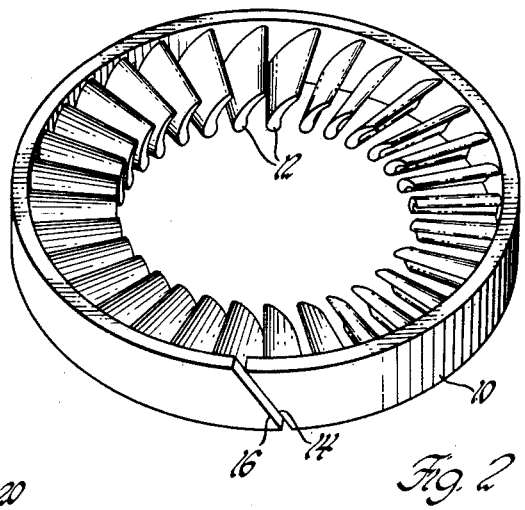
FIGURE 2 is a perspective view of a selected length of strip rolled into ring form just prior to joining the ends thereof.

Referring to the drawings, 10 indicates a strip of diecast material which can be of any suitable composition which can be utilized in the operation of a torque converter. Presently, elements of torque converters are made of metal either ferrous or non-ferrous, but it is understood that the invention is not limited to the use of metals since other materials may be employed. In actual practice, aluminum alloys have performed satisfactorily. The strip 10 has extending therefrom a plurality of blades 12 of airfoil cross section, i.e., rounded relatively thick noses from which the blade tapers to a thin tail edge. A strip, as shown in FIGURE 2, can be diecast radially since it is apparent that the movement of the die members will be in a direction at right angles of the strip 10. The draft of the blades 12 has been exaggerated in the drawing, but it is to be understood that the draft will be such as to permit ready separation of the dies from the finished strip.

Figure 1:
FIGURE 1 is a plan view of a diecast lineal strip with blades extending from one surface thereof.

As a second step in the manufacture of the torque converter element, a selected length of the lineal strip of FIGURE 1 may be cut with inclined edges as shown at 14 and 16 and the strip rolled into ring form. During such rolling, it may be necessary or desirable to heat the strip to a plastic state. The edges 14 and 16 can then be secured together by welding, brazing, or in any other suitable fashion. When the strip is rolled into ring form, the blades 12 will extend radially from the strip 10 and will have exposed ends.

Figure 3:
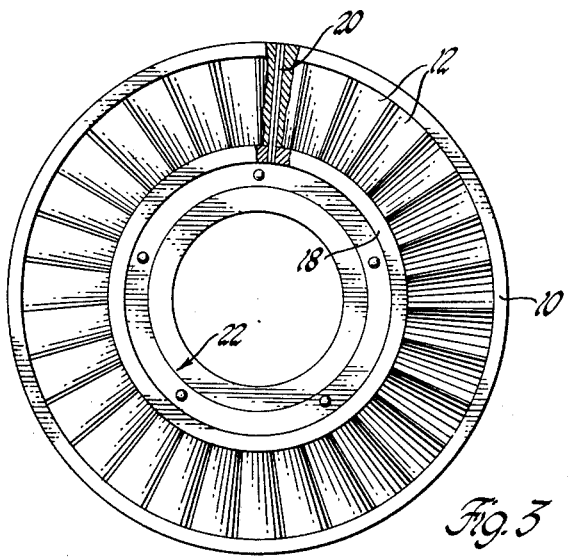
FIGURE 3 is a plan view of a completed element, in this instance, a stator for a torque converter.

As a third step, a ring with exposed blade ends, as depicted in FIGURE 2, can have secured to the exposed blade ends an inner shroud member 18 in the form of a diecast or otherwise manufactured ring. This inner shroud 18 can be secured to the exposed ends of the blades 12 by welding, brazing, or by the use of expanding pins such as shown at 20 in FIGURE 3. If use is made of a plurality of pins 20, holes will be drilled through the outer shroud 10 and through the length of the nose portion of a selected number of blades 12 to be aligned with a number of holes in the inner shroud. The expanding pins 20 can be introduced into the aligned holes in the shrouds and the blades. In the particular element shown wherein 31 blades are employed, it is contemplated that 15 pins 20 spaced at regular intervals around the element will be used. The inner shroud 18 may have secured thereto, in any suitable fashion, a hub 22 which may form the housing for a one-way clutch or brake commonly used in torque converters to prevent reverse rotation of the stator element relative to the direction of rotation of the pump or impeller of the converter. Such one-way brake forms no part of the present invention but is shown and described as being embodied in the hub 22 which hub can rotate in one direction relative to a stationary cylindrical member.

It will be understood that while the element illustrated and described is formed by rolling a strip 10 into a ring form by the blades 12 extending radially inwardly from the strip, it will be evident that the strip can be rolled so that the blades 12 extend radialy outwardly therefrom in which event an outer shroud of ring-like form would be secured to complete the element.

The invention is to be limited only by the following claims.

I claim:

1. The method of making a torque converter element which comprises die casting a one piece lineal element of suitable material having a portion providing a lineal strip of selected length including a smooth-surfaced side and a plurality of blades extending from said lineal strip at spaced intervals along said strip and having free ends, rolling said selected length of said strip into ring form, securing the ends of the strip together so as to form a smooth-surfaced ring thereby providing a shroud with blades extending therefrom and fastening a ring-like shroud member to the free ends of said blades.

2. The method of making a torque converter element according to claim 1 wherein said strip is rolled into ring form such that said blades extend radially from said shroud.

3. The method of making a torque converter element which comprises die casting a one piece lineal element of suitable material having a portion providing a lineal strip of selected length including a smooth-surfaced side and a plurality of blades extending from said lineal strip at spaced intervals along said strip and having free ends, rolling said selected length of said strip into ring form, securing the ends of the strip together so as to form a smooth-surfaced ring thereby providing an outer shroud with blades extending radially inwardly therefrom and fastening a ring-like shroud member to the free ends of said blades.

References Cited in the file of this patent

UNITED STATES PATENTS

| | | |
|---|---|---|
| 868,419 | Emmet | Oct. 15, 1907 |
| 905,460 | Rice | Dec. 1, 1908 |
| 986,974 | Haines | Mar. 14, 1911 |
| 1,062,737 | Richter | May 27, 1913 |
| 2,431,647 | Mayne et al. | Nov. 25, 1947 |
| 2,475,772 | Allen et al. | July 12, 1949 |
| 2,690,132 | Misch | Sept. 28, 1954 |
| 2,745,353 | Syrovy | May 15, 1956 |
| 2,925,953 | Keeley | Feb. 23, 1960 |
| 2,982,468 | Mayne | May 2, 1961 |
| 3,010,187 | Glasson | Nov. 28, 1961 |
| 3,120,697 | Zingstreim | Feb. 11, 1964 |

FOREIGN PATENTS

| | | |
|---|---|---|
| 14,569 | Great Britain | 1905 |
| 21,756 | Great Britain | 1907 |